US008233693B1

(12) United States Patent
DiFrancesco et al.

(10) Patent No.: US 8,233,693 B1
(45) Date of Patent: Jul. 31, 2012

(54) AUTOMATIC PRINT AND NEGATIVE VERIFICATION METHODS AND APPARATUS

(75) Inventors: David DiFrancesco, Point Richmond, CA (US); Dominic Glynn, Berkeley, CA (US); Hee Soo Lee, San Francisco, CA (US)

(73) Assignee: Pixar, Emeryville, CA (US)

( * ) Notice: Subject to any disclaimer, the term of this patent is extended or adjusted under 35 U.S.C. 154(b) by 1155 days.

(21) Appl. No.: 11/958,151

(22) Filed: Dec. 17, 2007

Related U.S. Application Data (60) Provisional application No. 60/870,680, filed on Dec. 19, 2006.

(51) Int. Cl.
*G06K 9/00* (2006.01)
(52) U.S. Cl. ....................................................... 382/141
(58) Field of Classification Search ........................ None
See application file for complete search history.

(56) References Cited

U.S. PATENT DOCUMENTS

| 2003/0012452 A1* | 1/2003 | Trifonov et al. | 382/275 |
| 2003/0133710 A1* | 7/2003 | Winberg et al. | 396/564 |

* cited by examiner

*Primary Examiner* — Tu Nguyen
(74) *Attorney, Agent, or Firm* — Kilpatrick Townsend & Stockton LLP; Philip H. Albert (57) ABSTRACT

A method for inspecting a reel of motion picture film including a first plurality of frames of film, the method includes receiving the first plurality of frames of motion picture film to determine a first plurality of digital data, receiving a second plurality of digital data associated with source data, comparing digital data from the first plurality of digital data to respective digital data of the second plurality of digital data to determine plurality of anomalies associated with the first plurality of frames of motion picture film, and recording the plurality of anomalies associated with the first plurality of frames of motion picture film in a log.

19 Claims, 5 Drawing Sheets

AUTOMATIC PRINT AND NEGATIVE VERIFICATION METHODS AND APPARATUS

BACKGROUND OF THE INVENTION

The present invention relates to automatic print verification. More specifically, the present invention relates to methods and apparatus for automatically verifying quality of motion picture prints Throughout the years, movie makers have often tried to tell stories involving make-believe creatures, far away places, and fantastic things. To do so, they have often relied on animation techniques to bring the make-believe to "life." Two of the major paths in animation have traditionally included, drawing-based animation techniques and stop motion animation techniques.

Drawing-based animation techniques were refined in the twentieth century, by movie makers such as Walt Disney and used in movies such as "Snow White and the Seven Dwarfs" (1937) and "Fantasia" (1940). This animation technique typically required artists to hand-draw (or paint) animated images onto a transparent media or cells. After painting, each cell would then be captured or recorded onto film as one or more frames in a movie.

Stop motion-based animation techniques typically required the construction of miniature sets, props, and characters. The filmmakers would construct the sets, add props, and position the miniature characters in a pose. After the animator was happy with how everything was arranged, one or more frames of film would be photographed with that specific arrangement. Stop motion animation techniques were developed by movie makers such as Willis O'Brien for movies such as "King Kong" (1933). Subsequently, these techniques were refined by animators such as Ray Harryhausen for movies including "Mighty Joe Young" (1948) and Clash Of The Titans (1981).

With the wide-spread availability of computers in the later part of the twentieth century, animators began to rely upon computers to assist in the animation process. This included using computers to facilitate drawing-based animation, for example, by painting images, by generating in-between images ("tweening"), and the like. This also included using computers to augment stop motion animation techniques. For example, physical models could be represented by virtual models in computer memory, and manipulated.

One of the pioneering companies in the computer-aided animation (CA) industry was Pixar. Pixar is more widely known as Pixar Animation Studios, the creators of animated features such as "Toy Story" (1995) and "Toy Story 2" (1999), "A Bugs Life" (1998), "Monsters, Inc." (2001), "Finding Nemo" (2003), "The Incredibles" (2004), "Cars" (2006) and others. In addition to creating animated features, Pixar developed computing platforms specially designed for CA, and CA software now known as RenderMan®. RenderMan® was well received in the animation industry and recognized with two Academy Awards®. The RenderMan® software included a "rendering engine" that "rendered" or converted geometric and/or mathematical descriptions of objects into a two dimensional image.

For typical feature-length animated features, typically 125, 000 to 175,000 frames of animated images are rendered. These rendered images are then transferred onto film stock to create a "release print" that are projected to an audience. However, at Pixar, before providing prints to a theater, the inventors have typically manually reviewed the "release print" candidates to guarantee a high quality level of release prints that are delivered to theaters.

Typically, the quality control process includes identification and reporting of film printing anomalies, film processing anomalies, image characteristics that exceed a threshold, and the like. These types of anomalies may be a result of dirt/hair/ or scratches on the media, problems with the image recorder (e.g. laser recorder) such as data overflows or data underflows, improper or inconsistent exposure of the media, improper or inconsistent development parameters (e.g. old chemicals/new chemicals, changed development recipes), and the like.

A typically process used by the inventors has included observing a projected print candidate in real-time, and looking for anomalies. A problem recognized by the inventors is that the review of the film media is very time consuming, capital intensive, and burdensome for reviewing personnel. In practice, the inventors have budgeted use of a theater, a projector, a projectionist, and a number (e.g. three) of reviewers 60 minutes for review and reporting of two 20 minute film reels. Thus, for quality control review of a single featurelength film of six 20 minute reels, approximately 13.5 man hours are consumed. This is very burdensome for a company or organization when there are any significant number of film candidates (e.g. 60+).

Another problem recognized by the inventors is that due to human nature, different reviewers of the print candidate may identify different anomalies, and that each reviewer may have different standards of what they consider an anomaly. Additionally, because reviewers may be fatigued or have different levels of fatigue, earlier approved release prints may have lower levels of visual anomalies than later approved release prints. As a result, a problem recognized by the inventors is that the root causes of identified anomalies may be difficult when there are different reviewers. Because of this, if the root causes (e.g. old chemicals, bad film stock, scratched internegative) of the anomalies are not identified earlier in the film duplication process, thus leading to wasted film and duplication time. In addition, this may also lead to wasted reviewing time. For example, after reviewing a large batch (e.g. ten) of print candidates only a few prints releases (e.g. two) may be identified.

In light of the above, what is desired are more efficient ways for ensuring quality of prints, without the drawbacks described above.

BRIEF SUMMARY OF THE INVENTION

The present invention relates to print verification. More specifically, the present invention relates to methods and apparatus for automatically inspecting quality of frames of film recorded from digital data.

One method for performing the automatic print verification includes filming-out an internegative copy of a work using digital source image data. A release print may be made from the master negative or internegative using direct contact techniques, or exposed directly to print stock. Next, the release print candidate or negative is placed in a film scanner and discreet frames of the print are captured in the film scanner having illumination sources and an image sensor. In various embodiments, the scanned image or the source image may be calibrated to be in the same gamut before comparison or the scanned negative may be modified to "look like" projected print before the comparison. For example, the source image may be modified to "look like" film, before the comparison. Additionally, image registration, rotation, and the like may be performed. An analysis computer may receive the scanned images and the source images, and perform an analysis/characterization in real-time or faster than real time. For instance, the analysis computer may use a CPU or GPU to perform fast imaging kernels to determine dirt/scratches, subtractions, convolutions, or the like. In response to the processing and characterization, visual anomalies are classified and reported in a log for the user. The log may also include the scanned image, the source image, the index number (e.g. footage count), and the like.

The inventors believe that embodiments of the present invention will quickly, accurately inspect printed copies of digital works. This is enabled by being able to locate, register, and compare scanned images of the work to the source images. This is believed to be repeatable, and one should be able to guarantee consistent levels of quality between different copies of the work. The components of embodiments of the system described herein are readily accessible, and are expected to be able to scale as technology increases (e.g. sensor resolution increases, speed of processing increases, etc.). In contrast to previously described techniques, the handling of the copy of the work is reduced, as only one-pass scanning is required of the work. Additionally, the number of personnel needed to perform the analysis is greatly decreased. For example, instead of three reviewers, a single reviewer may review the defect log and images.

According to one aspect of the invention, a method for a print verification system having a memory including a plurality of digital source image data representing a plurality of source images is described. Various processes include driving a film recorder with the plurality of digital source image data, wherein each source image is associated with a unique identifier, recording a plurality images onto film media with the film recorder in response to the plurality of digital source image data, and processing the film media to form a print candidate having a plurality of images. Techniques may include optically scanning the plurality of images of the print candidate to form a plurality of scanned images, and determining a unique identifier associated with each scanned image from the plurality of scanned images. Methods may include comparing a source image associated with a first identifier to a scanned image from the plurality of scanned image also associated with the first identifier to determine whether there are any visual anomalies in the scanned image, and when visual anomalies exist in the scanned image, reporting the first identifier, and a description of the visual anomalies in the scanned image, to a log which is reviewable by a user.

According to another aspect of the invention, a method for inspecting a reel of motion picture film comprising a first plurality of frames of film is disclosed. One technique includes receiving the first plurality of frames of motion picture film to determine a first plurality of digital data, and receiving a second plurality of digital data associated with source data. Processes may include comparing digital data from the first plurality of digital data to respective digital data of the second plurality of digital data to determine plurality of anomalies associated with the first plurality of frames of motion picture film; and recording the plurality of anomalies associated with the first plurality of frames of motion picture film in a log.

According to yet another aspect of the invention, a method for inspecting a reel of motion picture film comprising a first plurality of frames of film is disclosed. A technique includes receiving a first plurality of digital image data associated with a reel of motion picture film, receiving a second plurality of digital image data, processing the first plurality of digital image data to form a first plurality of digital data, and processing the second plurality of digital image data to form a second plurality of digital data. A process may include comparing digital data from the first plurality of digital data to respective digital data of the second plurality of digital data to determine plurality of anomalies associated with frames of the first plurality of frames of motion picture film, and storing the plurality of anomalies in a log associated with the reel of motion picture film.

According to one aspect of the invention, a computer system is described that is configured to perform embodiments of the invention described below.

According to one aspect of the invention, computer program product may include a computer-readable tangible media, such as a semiconductor media (e.g. RAM, flash memory), magnetic media (e.g. hard disk, SAN), optical media (e.g. CD, DVD, barcode), or the like, that includes executable computer code configured to perform operations as described in embodiments of the invention below.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

DETAILED DESCRIPTION OF THE INVENTION

Figure 1:
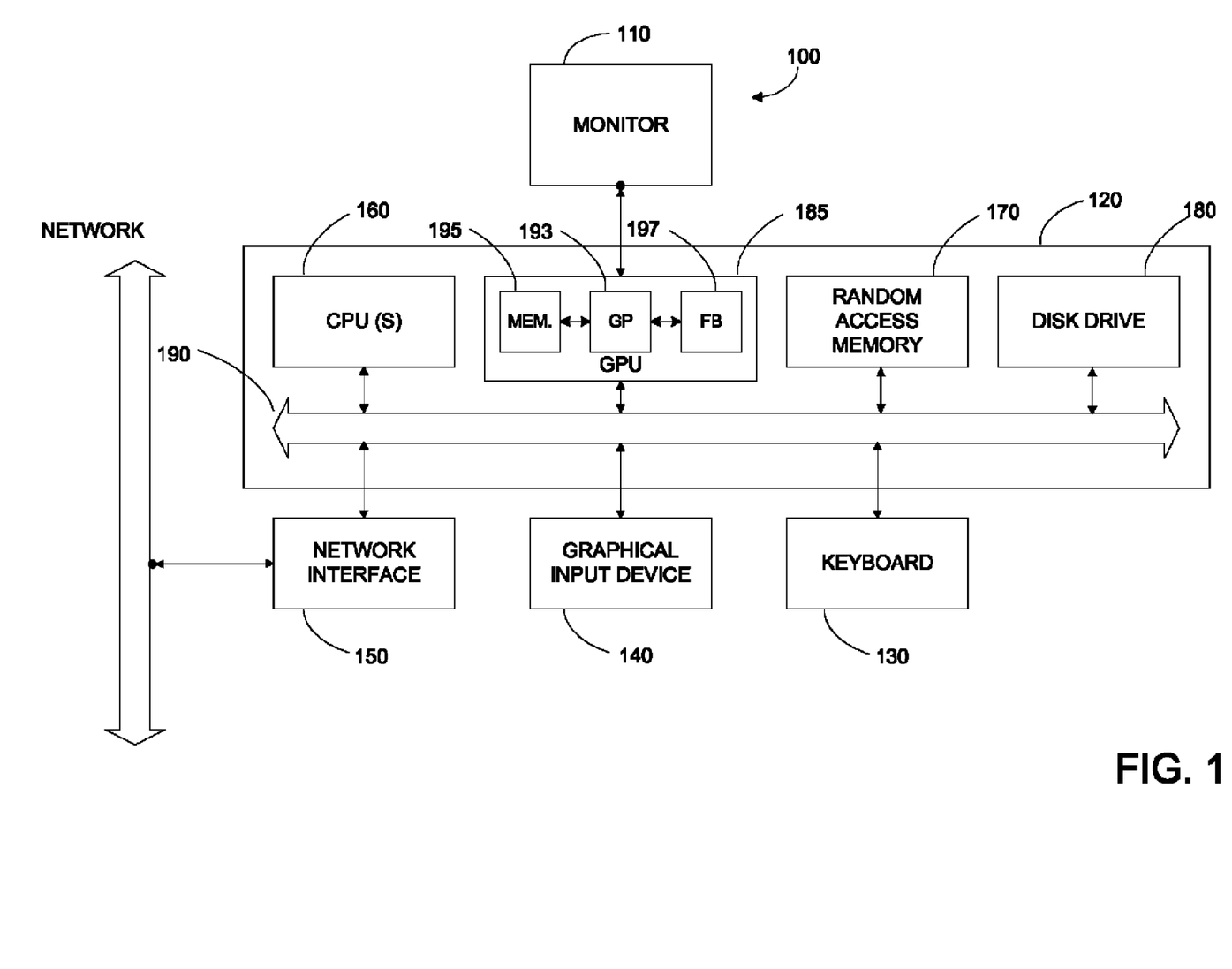
FIG. 1 is a block diagram of typical computer system according to an embodiment of the present invention.

FIG. 1 is a block diagram of typical computer system 100 according to an embodiment of the present invention.

In the present embodiment, computer system 100 typically includes a monitor 110, computer 120, a keyboard 130, a user input device 140, computer interfaces 150, and the like.

In the present embodiment, user input device 140 is typically embodied as a computer mouse, a trackball, a track pad, a joystick, wireless remote, drawing tablet, voice command system, eye tracking system, and the like. User input device 140 typically allows a user to select objects, icons, text and the like that appear on the monitor 110 via a command such as a click of a button or the like.

Embodiments of computer interfaces 150 typically include an Ethernet card, a modem (telephone, satellite, cable, ISDN), (asynchronous) digital subscriber line (DSL) unit, FireWire interface, USB interface, and the like. For example, computer interfaces 150 may be coupled to a computer network, to a FireWire bus, or the like. In other embodiments, computer interfaces 150 may be physically integrated on the motherboard of computer 120, may be a software program, such as soft DSL, or the like.

In various embodiments, computer 120 typically includes familiar computer components such as a processor 160, and memory storage devices, such as a random access memory (RAM) 170, disk drives 180, a GPU 185, and system bus 190 interconnecting the above components.

In one embodiment, computer 120 includes one or more Xeon microprocessors from Intel. Further, in the present embodiment, computer 120 typically includes a UNIX-based operating system.

RAM 170 and disk drive 180 are examples of tangible media configured to store data such as digital source image data, scanned images, scanned digital data, defect logs, image files, models including geometrical descriptions of objects, ordered geometric descriptions of objects, procedural descriptions of models, scene descriptor files, a rendering engine, embodiments of the present invention, including executable computer code, human readable code, or the like. Other types of computer-readable tangible media include magnetic storage media such as floppy disks, networked hard disks, or removable hard disks; optical storage media such as CD-ROMS, DVDs and bar codes; semiconductor memories such as flash memories, read-only-memories (ROMS); battery-backed volatile memories; networked storage devices, and the like.

In the present embodiment, computer system 100 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiments of the present invention, GPU 185 may be any conventional graphics processing unit that may be user programmable. Such GPUs are available from NVIDIA, ATI, and other vendors.

FIG. 1 is representative of a computer system capable of embodying various aspects of the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other micro processors are contemplated, such as Xeon™, Pentium™ or Core™ microprocessors; Turion™ 64, Opteron™ or Athlon™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, OSX and the like. In still other embodiments, the techniques described above may be implemented upon a chip or an auxiliary processing board.

Figure 2:
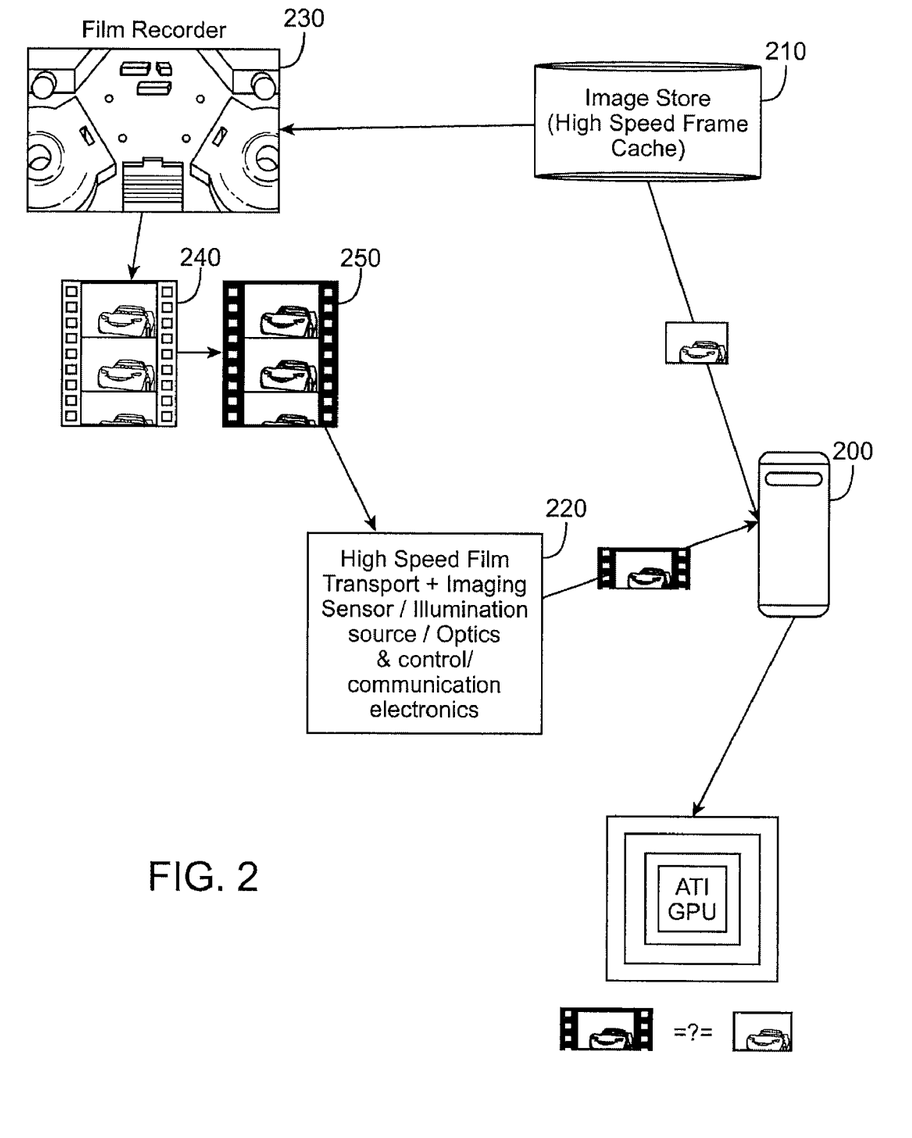
FIG. 2 illustrates a block diagram of a process according to one embodiment of the present invention.

FIG. 2 illustrates a block diagram of a system according to various embodiments of the present invention. FIG. 2 illustrates a computer system 200 coupled to an image cache 210 and to a scanning system 220. Image cache 210 is also coupled to a media recorder, e.g. a film recorder 230. Also illustrated in FIG. 2 are a film negative 240 and a film positive 250.

In various embodiments, computer system 200 may be embodied as computer system 100 possibly including a GPU 185, as discussed above. As will be discussed, computer system 200 is used to perform the verification or characterization of the images printed on print media (e.g. celluloid, paper, etc.) to the original (source) digital data.

In various embodiments, the digital source image data representing source images (original images) in a work may be provided by an image cache 210 to film recorder 230 at a high data rate. Image cache 210 may itself be a computer system, e.g. computer system 100, that stores, or provides access to storage that stores the digital source image data representing a work (e.g. feature-film, short subject film, etc.). In various embodiments, image cache 210 may be a front-end of a media storage system, where the digital source image data is stored remote to image cache 210. For example, image cache 210 may be embodied as a data-base access system, an asset management front-end, an archival storage system front-end, or the like. In other embodiments, image cache 210 may be portable and store the digital source image data locally, for example, in a hard drive, an optical disc, a tape, or the like.

In some embodiments of the present invention, image cache 210 provides access to digital source image data for film recorder 230. In some embodiments, the source data is sourced from rendered digital images. In some embodiments, the source image data is derived from a scan of another negative, original camera negative or another print. In some embodiments, the expected data frame rate of the digital source image data is 24 data frames per second (fps), matching a standard motion picture frame rate. In other embodiments, the data frame rate may be different, for example, 48 fps, 60 fps, 16 fps, or the like. In various embodiments, each image represented by the digital source image data is typically indexed with an identifier, such as a number, alphanumeric identifier, or the like.

In various embodiments, the resolution of the digital source image data is currently approximately two to approximately four mega pixels. In other embodiments, the image resolution may be smaller, e.g. approximately one mega pixel, or larger, e.g. approximately eight megapixels. Additionally, in various embodiments, the aspect ratio for the digital source image data may vary freely, according to what is desired. For example, the ratio may be 1.33, 1.77, 2.39, anamorphic ratio, or the like.

In various embodiments of the present invention, film recorder 230 may be any conventional film recorder, such as an Arrilaser film recorder by Arri, or the like. In some embodiments, film recorder 230 may be based upon laser illumination, and image cache 210 may provide digital source image data to control the one or more lasers in film recorder 230. In other embodiments, other types of transfer of digital source image data to image are contemplated. For example, the digital source image data may drive a CRT, or the like. In other embodiments, the digital source image data drives one or more illuminated LCD panels. Examples of this are disclosed in co-pending U.S. application Ser. No. 10/698,985 filed Oct. 31, 2003. This application is incorporated herein for all purposes.

In various embodiments of the present invention, un-exposed film stock is then exposed to the lasers or display devices. In some embodiments, recording an image based upon the digital source image data to one frame of the film stock may take from approximately 1 to 4 seconds. In some conventional laser film recorders, one frame takes approximately 3.5 seconds to scan the lasers across the film stock. These times are merely examples, and in the future, it is expected that recording times will decrease.

In various embodiments of the present invention, the film stock may be negative film stock or positive film stock. In some embodiments, the negative film stock may be used to form a master negative, from which interpositives or internegatives are optically made, or any other type of negative are optically made from which a "release print" may be made via contact-printing, or the like. In cases where positive film stock may be used, a "release print" may be directly made, or an "interpositive" may be made. In various cases, the interpositive may be used to print one or more internegatives, which themselves may be used to make release prints. These "printed" copies of the work may be subject to inspection, as described below.

In alternative embodiments of the present invention, the inventors contemplate that film recorder 230 may be any other type of digital to printed media transfer apparatus. For example, printed media may be paper media, plastic media, semiconductor media, metal media, or any other type of media which can be viewed.

In various embodiments, each image recorded onto the film stock may be associated with the same index number as the digital source image data. In some embodiments, the index may be recorded onto the film, and in other embodiments, the index may be determined based upon the position of the frame on the reel, and the specific reel number. In some embodiments, the index may be determined analytically by comparing attributes of source and scanned images and/or interframe attribute (e.g. image content, shot boundaries etc.). As an example of the latter case, if reels include 28,800 frames, the 400th frame of the third reel can be determined to be associated with index number 58,000, for example.

In various embodiments of the present invention, scanning system 220 is used to digitize the printed media, (e.g. the internegative, the release print, the printed poster, etc.). In one embodiment, scanning system 220 may be an Arriscan film scanner by Arri, or the like. In other embodiments, other manufacturers or types of film scanner systems can be used.

In some embodiments of the present invention, the inventors have discovered that the resolution of images scanned by scanning system 220 need not be as high as the digital source image data provided by image cache 210 in some cases. For example, for film media such as release prints, the resolution of the digital source image data may be on the order of 2 megapixels, whereas scanning system 220 may scan a frame of the film media to a resolution of one megapixel. As another example, the digital source image data may be on the order of four megapixels, whereas scanning system 220 may scan at a resolution of 1.5 mega pixels, or the like.

In various embodiments, the scanning of frames of the film may be on the order of 8 frames a second, or the like. The specific rate of scanning may vary greatly dependent upon scanning resolution, and the like. Accordingly, the specific number of frames per second is not limiting in various embodiments.

As discussed above, each frame of the film are associated with an index number that also identifies the digital source image data. In some embodiments, the index may be optically or magnetically determined from the film itself, whereas in other embodiments, the index number may be determined depending upon the frame number on the reel and the reel number. As illustrated in the example above, such data are easily determinable.

In various embodiments, as mentioned above, computer system 200 is used to perform the comparison of the source image and the scanned image from a frame of film recorded with the digital source image data. This may be done by comparing the index numbers associated with the source image and the scanned image. In various embodiments, a GPU may be included in computer system 200 to accelerate the comparison process. In some embodiments, the inventors expect to be able to compare 65 to 70 frames per second. In the future, as CPU processing power increases, GPUs may not be needed; additionally as GPU processing power increases, the number of frames per second compared may increase. Accordingly, the specific number of frames per second is not limiting in various embodiments.

In various embodiments, computer system 200 may perform image processing operations on the digital source image data and the scanned image. For example, computer system 200 may perform sub-sampling of the source image, image parameter correction (e.g. brightness, rotation, alignment), defect identification/characterization, defect reporting, and the like.

Figure 3A:
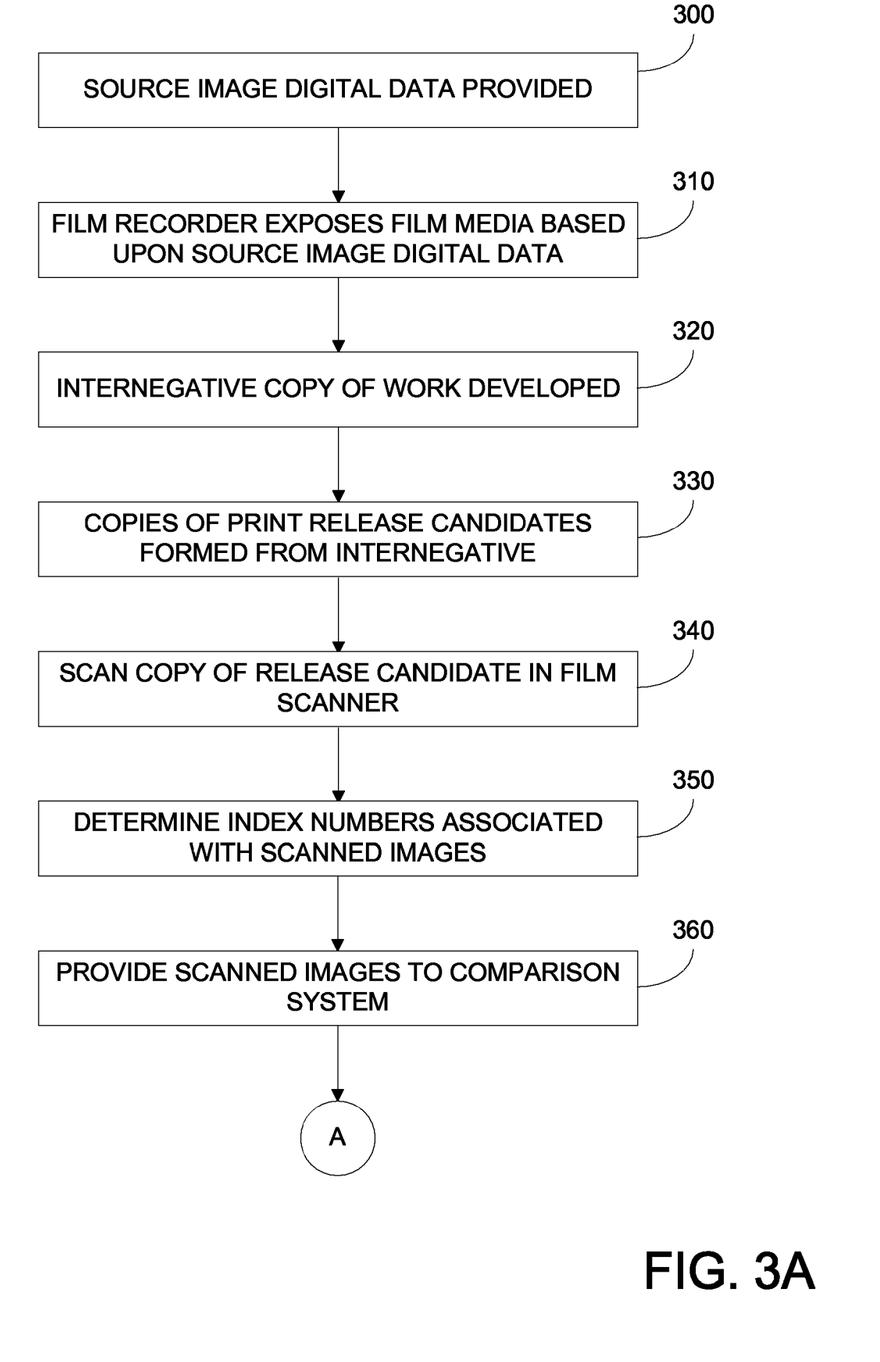
FIGS. 3A-B illustrate a flow diagram according to an embodiment of the present invention.
Figure 3B:
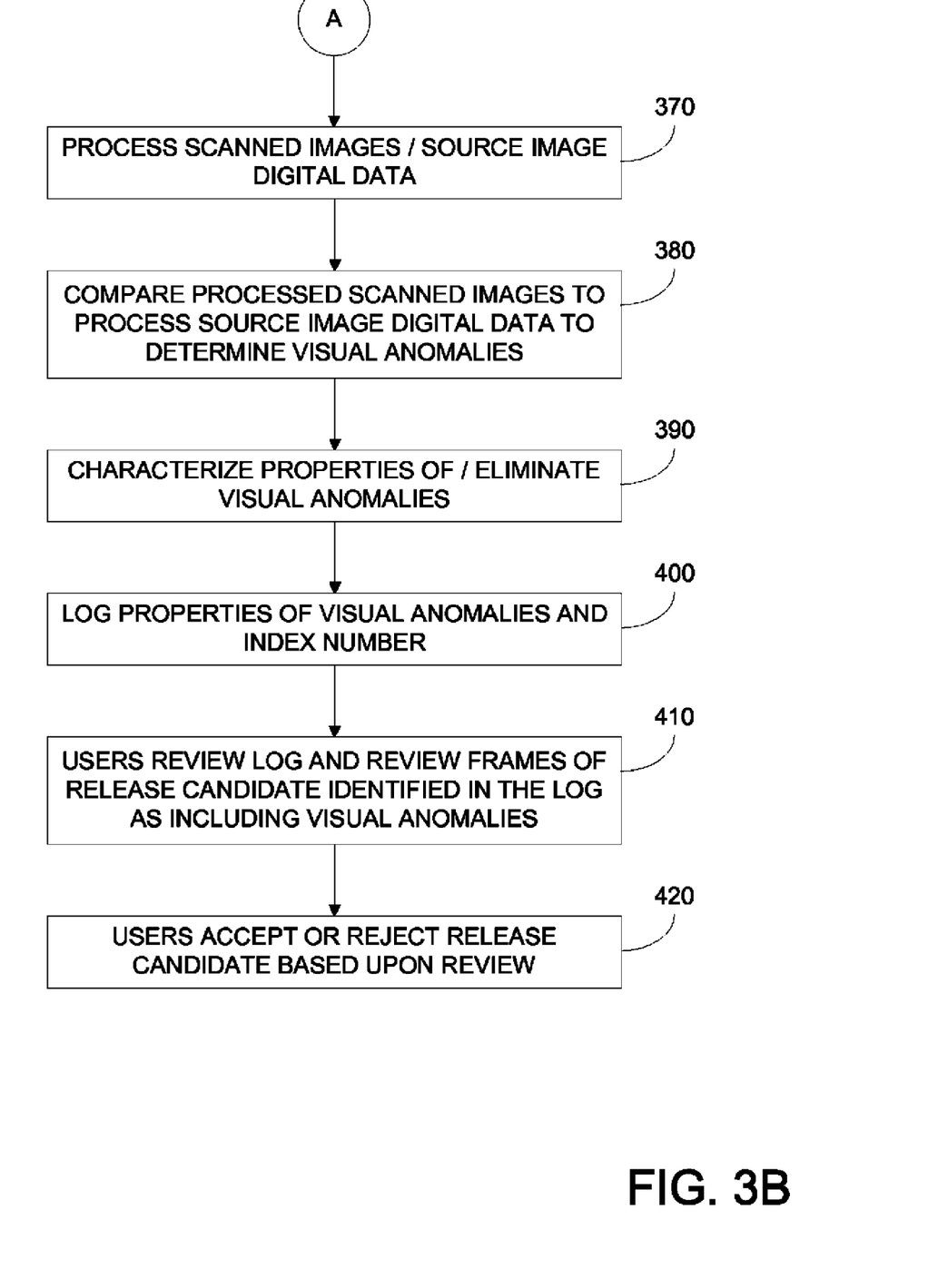

FIGS. 3A-B illustrate a flow diagram according to various embodiments of the present invention. More specifically, FIGS. 3A-B illustrate a process with reference to the elements illustrated in FIG. 2.

Initially, an image store 210 is provided having stored therein digital source image data, step 300. In various embodiments, image store 210 may be one or more physical optical or magnetic disks storing the digital source image data. In some embodiments, image store 210 may be provided by a user or organization that produces the digital source image data. The digital source image data may represent one or more images, sometimes in the form of a motion picture for a "short," a feature-length film, or the like. The digital source image data may represent animation data, live-action data, combination of animation and live-action, or the like. In some embodiments, digital source image data may be derived from a "video tap feed," as is known in the industry, may be a test pattern or test chart, may be a digitally created (e.g. procedurally created, or rendered) image, or the like.

In some embodiments of the present invention, embodiments of the automatic print verification system may be performed "in-house" by the producer of the digital source image data. In other embodiments, the automatic print verification system my be performed by a third party (e.g. transfer party). In some cases, the third party may be a user, company, organization, or the like that specializes in the transfer of digital source image data to the print media. For example, transfer parties may specialize in the production of duplicate print media, or release prints via the use of master negatives, interpositives, internegatives, or the like.

In some embodiments, image store 210 need not be a physically transfer, such as delivery of a hard drive. In various embodiments, image store 210 may be a network-based storage system that can provide the digital source image data to the transfer party who performs the film recording. In some cases, the user may access the digital source image data via a secure computer network. For example, the digital source image data may be stored at a particular FTP address, and the transfer party would have to provide one or more user name/password combinations to access the digital source image data. In other examples, other methods of accessing network-based data is contemplated, for example, via HTTPs protocol, via VPN, or the like. In still other examples, the digital source image data may itself be protected via password, public key encryption, and the like.

In FIGS. 3A-B, once the digital source image data is provided to film recorder 230, film recorder 230 converts the digital source image data into light, and exposes unexposed film stock, or the like, to the light. Step 310. In various embodiments, the digital source image data may be converted directly into light, for example, via lasers or LED; in other embodiments, the digital source image data may drive a micro-display to which light (e.g. Xenon, LEDs) is applied; and the like. In various embodiments, the micro-display may be a transmissive LCD, a reflective LCD (e.g. LCoS), or the like, as discussed in the above-referenced patent application.

In various embodiments, the digital source image data may be negative data or positive data. Additionally, the unexposed media (e.g. film stock, paper) may be negative media, or positive media. The type of recording performed obviously varies according to the requirements of the producer of the digital source image data and/or the transfer party.

In some embodiments, after the media (e.g. film) is exposed, the exposed media may then be processed, step 320. For example, in the case with exposed film media, an exposed negative film may be developed using traditional processes to result in a first copy (e.g. a master negative) of the work (e.g.

feature-film, short subject film, etc.). Subsequently, in various embodiments, additional copies of the work may be formed, step 330. As an example, one or more release prints may be made from a master negative or an internegative using conventional techniques, such as high-speed contact printing.

In some embodiments of the present invention, steps 310 and 320 need not be performed. For example, in some cases, step 310 may be embodied as a printer, plotter, or the like, and these devices may directly print (e.g. deposit, etch, or the like) upon media (e.g. paper, plastic, etc.). Accordingly, such steps 310 and 320 need not be performed, or in other embodiments simplified steps 310 and 320 are performed.

In various embodiments, various copies of the work may visually inspected with the following described techniques. The inspection process may be performed by the user (e.g. transfer party) or company that performs the transfer of the digital source image data to the printed media, or may be performed by the producer of the digital source image data, or the like. As an example, the copies of the work may be physically transferred back to the producer of the digital source image data for inspection/approval.

Initially, one or more copies of the work, described above, are provided into a scanning system 220, and then digitized, step 340. In some examples, scanning system 220 may be a conventional film scanner, or the like. In various embodiments, such conventional film scanners typically include film transport mechanisms, imaging sensors, illumination sources, adjustable optics, electronic controls, and the like. Some film scanners are capable of scanning frames of film at a resolution of approximately two megapixels, at four to eight frames per second, however different rates of scanning are expected in the future. As mentioned above, a typical film scanner may be the Arriscan film scanner from Arri.

In some embodiments of the present invention, a film scanner may include an infrared illumination source, in addition to visible illumination. In such cases, the infrared illumination source may be used to identify surface contaminants on the work such as dirt, hair, and other particles that are deposited upon the surface of the film or media. In various embodiments, manual techniques may be used to identify such surface contamination. In other embodiments, automatic techniques provided by Digital ICE or similar processes may be used to identify the surface contaminants, however, such processes sometimes undesirably automatically removes scratches in the emulsion from appearing on the scanned image. Various embodiments may be useful to help distinguish "defects" on a scanned work that are on the surface of the work from visual defects recorded on the scanned work, as will be described below.

In various embodiments of the present invention, the scanning resolution of the work is lower than what is normally expected for optical inspection processes. In various examples, the digital source image data has a resolution of approximately two mega pixels, and the resolution of the scanned work is approximately one mega pixel. With traditional optical inspection techniques, for example, to adequately sample work recorded with 2,000×1,000 resolution, the work would have to be scanned at least at 4,000×2,000 resolution, to meet the Nyquist principles. Accordingly, for a work having a resolution of two megapixels, the scan should be at a resolution of at least eight megapixels.

In various embodiments of the present invention, because the scanning resolution may be much less than the resolution of the digital source image data, the scanning process should be much more efficient. For example, instead of scanning one frame of the work at a resolution of approximately two megapixels, scanner device 220 may scan two or more frames of the work at a resolution of one megapixel. Other advantages include that film scanners having a lower resolution than "state-of-the-art" film scanners may be used in embodiments of the present invention. Accordingly, two or more lower resolution film scanners may be used instead of a single higher resolution film scanner. Further, both lower resolution film scanners may be used at the same time, thereby decreasing the total scanning time, and thereby increasing the throughput of the inspection process.

In some embodiments, in addition to scanning the work, scanning system 220 may also determine an index number associated with the scanned image, step 350. As discussed above, the index number may be used to locate the corresponding digital source image data provided to film recorder 230. As examples, the index identifier (e.g. index number) may be determined by counting the number of frames previously scanned; by using the reel number and the frame number in the reel; or the like. In other embodiments, the association between the scanned images and the index number may be performed by computer system 200.

In various embodiments, the scanned data is provided to computer system 200, step 360. In some embodiments scanner device 220 may be directly coupled to computer system 200, such that the scanned digital data from scanner device 220 is recorded onto one or more storage media associated with computer system 200. For example, the scanned data may be stored on a hard drive of computer system 200; the scanned data may be stored on a network storage device, or the like. In other examples, the scanned data may be stored on a removable drive associated with scanner device 200, and the removable drive may be physically moved and connected to computer system 200. Various other methods, as discussed above, are also contemplated.

In computer system 200, additional processing steps may be performed on the scanned digital data and the digital source image data prior to comparison, step 370. In various embodiments, such processing steps may include correcting for any rotation of source images, normalizing the brightness or contrast of the images in the scanned digital data, determining the index number to be associated with the scanned digital data, correction of gamut to match the digital source image data, and the like. For the digital source image data, processing steps may include sub-sampling the digital source image data to better match the resolution of the scanned image, correction of gamut to match the scanned digital data, and the like. Other types of operations or transformation may be performed on both of the images prior to comparison, such as: fast Fourier transforms, filters, zooms, shifts, image encodings, etc.

Subsequently, in various embodiments, the processed scanned digital data and associated the processed digital source image data are compared, step 380. As discussed above, the scanned digital data is associated with an index number that is the same as an index number associated and the digital source image data. In some embodiments, the comparison step may include a subtraction step, as well as other image processing steps.

In various embodiments, a number of defect elimination and characterization steps may be performed upon the compared images, step 390. Characterization of defects may include any number of image processing techniques, to characterize dimensions of defects, to classify defects based upon relative dimensions, e.g. long, narrow defects tend to be "line defects" (e.g. caused by hair, lint, scratches, etc.), defects covering a large area tend to be process-type defects (e.g. caused by wet-film development, etc, and the like.) In other embodiments, other types of defects may include comparing the colors of the images, the saturation, and the like.

In some embodiments of the present invention, certain types of "defects" may be eliminated from a list of defects by the software automatically. For example, reel change marks or cues that visually indicate to a projectionist when to change to the next reel, may be automatically removed from the list of defects. Additionally, other types of intentional marks included in the image, such as marks for security purposes, may also be automatically removed from the list of defects. Such intentional marks may include watermarks, copy-protection marks, timing marks and the like.

After characterization of the remaining defects, a defect report for the media is produced, step 400. In various embodiments, the defect report may be organized by frame number on the reel, index number of the work, or the like. In some embodiments, the defect report only specifies the location of defect within a specific reel. Additionally, in some embodiments, instead of referencing the frame number of the specific reel, or a frame number in the entire work, a footage counter is provided that indicates the elapsed footage of a reel. In such examples, the footage counter typically begins from the first frame (or first sync mark) of the work on that reel, and typically plays back at about 1.5 feet/second. Based upon the elapsed film footage, one can easily identify which frame a defect appears. Accordingly, the footage counter (e.g. 500' 6", 700' 8th frame) and the frame number described above are both valid ways for identifying specific frames in the reel.

Additionally, in some cases, the defect report may also include the approximate location of a defect within a certain image, and/or a classification for the identified defect in step 390, above. Thus for example, a defect report may include:

index: 930' 6", (400,643) white scratch, (553,432) dark scratch     index: 1000' 2", (1000,1200) area defect     index: 1950' 8", (1997,611) reel mark . . .

In various embodiments, based upon the defect report, one or more users may view the indexed images to confirm the defect, step 410. In some embodiments, the one or more users may be personnel associated with the film transfer process, for example, looking for defects in an internegative copy of a work, looking for defects in a master copy of the work, or the like, before release prints are printed therefrom. Additionally, the one or more users may be associated with the producer to inspect each copy of the release print, before accepting and paying for the copy of the work. In various embodiments, the one or more users may view the scanned digital data associated with the index, or may project and directly view the frame of the work transferred to the print media (e.g. release print).

In light of the above, instead of user review of the entire work, the user may only review specific frames flagged by the defect log, if desired. Accordingly, reviewing a copy of the work (e.g. original negative, interpositive, internegative, release candidate) would not take the 30+minutes it currently takes. Instead, it is envisioned that a conventional 20 minute reel may be automatically reviewed, as discussed above in less than 10 minutes (e.g. @ 65 frames per second). Subsequently, in the case where a user desires to review the defects, it is envisioned that the review only includes the specific frames that are flagged for defects. This would take a very short amount of time.

Figure 4:
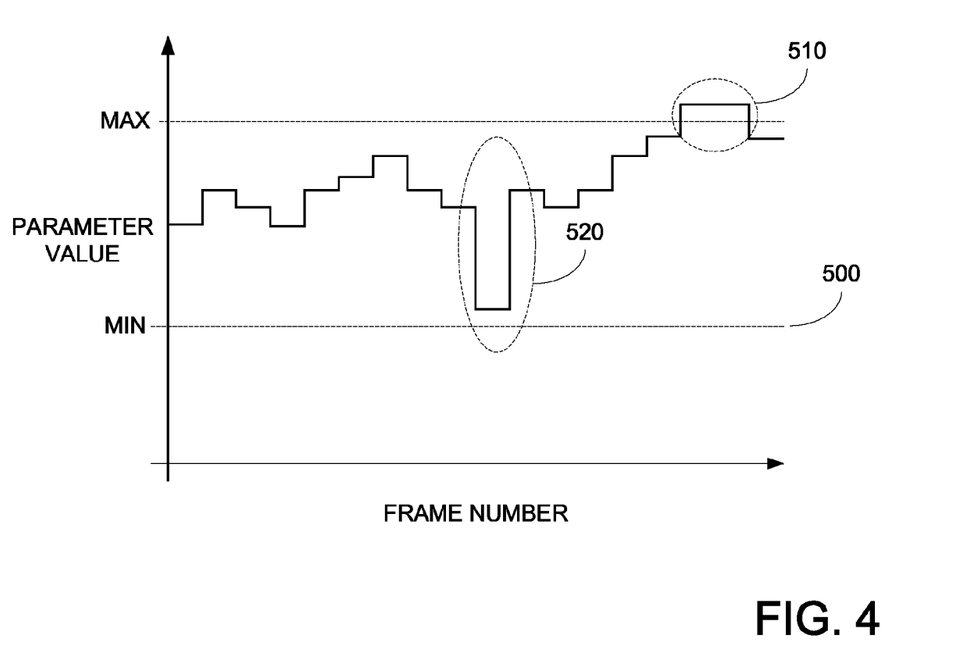
FIG. 4 illustrates an example according to an embodiment of the present invention.

In various embodiments of the present invention, other types of comparisons may be performed to identify defects or anomalies. For example, in addition to comparing a brightness of a scanned digital data to the digital source image data, the absolute brightness of the scanned digital data may also be compared to absolute limits, E.G. 500, as illustrated in FIG. 4. In the example in FIG. 4, 510 illustrates the identification of frames where the image parameters exceed the maximum for the parameter value.

In other embodiments, image parameters of successive scanned images may be monitored. For example, within a "scene" the change in brightness of scanned images may be constrained to a particular rate of change, as also illustrated in FIG. 4. If the change in brightness exceeds a particular rate, e.g. 520, it may signal a defect within one or more images. For example, a single image within a scene may be blank, or only partially written because of a buffer overflow or buffer under run in film recorder, 230, or the like. In other embodiments, other types of comparisons may be made from successive images in the scanned digital data. For example, the overall color of an image may be compared, the saturation of successive images may be compared, etc. In such embodiments, similar to above, comparisons may be made as to absolute limits of these parameters, as well as rate of change between successive images. In light of the present disclosure, the inventors believe that many other types of defects may also be determined.

After these review steps, the user may accept or reject the copy of the work, step 420. For example, if the user is a transfer party, and the copy of the work is an internegative or master negative, the transfer party may reject the copy and create a new master negative or internegative if there are significant defects. Alternatively, if there are no significant defects in the master negative or internegative, the transfer party may use the master negative or internegative to make release print candidates. Similarly, the producer of the digital source image data, may accept or reject a copy of a release print candidate depending upon the types or number of defects on the release print candidate.

It is expected that any number of different types of users may be interested in the herein disclosed embodiments of the present invention. For example, users may include film laboratories and film bureaus (motion picture and still film); digital intermediate post production houses (post houses) (e.g. Technicolor, Pacific Title, Deluxe, or the like); film handling/printing/development equipment manufacturers (e.g. Arri, Filmlight, Kodak, or the like); film stock manufacturers (e.g. Kodak, Fuji, or the like), and production companies (e.g. Pixar, Dreamworks, Sony Pictures, Lucasfilm, or the like).

Further embodiments can be envisioned to one of ordinary skill in the art after reading this disclosure. In other embodiments, combinations or sub-combinations of the above disclosed invention can be advantageously made. The block diagrams of the architecture and graphical user interfaces are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made without departing from the broader spirit and scope of the invention as set forth in the claims.

What is claimed is:

1. A method for inspecting a reel of motion picture film comprising a first plurality of frames of motion picture film, wherein the reel of motion picture film has transferred thereon to film stock a sequence of images generated from digital image source data, the method comprising:

receiving a scanned copy of the first plurality of frames of motion picture film to determine a first plurality of digital data, scanned from the film stock;

receiving a second plurality of digital data associated with the digital image source data and corresponding to at least some images of the sequence of images;

comparing digital data from the first plurality of digital data to respective digital data of the second plurality of digital data to determine plurality of anomalies associated with the first plurality of frames of motion picture film, wherein at least some of the compared digital data corresponds to images transferred to the film stock as part of the first plurality of frames that are also images of the second plurality of digital data; and recording the plurality of anomalies associated with the first plurality of frames of motion picture film in a log.

2. The method of claim 1 further comprising recording which frames of motion picture film from the first plurality of frames of motion picture film are associated with anomalies from the plurality of anomalies in the log.

3. The method of claim 1 wherein the reel of motion picture film comprises a reel selected from a group consisting of: a print release candidate, a negative, a positive, an internegative, an interpositive, original camera negative, master negative, answer print.

4. The method of claim 1
wherein receiving the second plurality of digital data comprises scanning a second plurality of frames of motion picture film having transferred thereon images generated from the digital image source data; and
wherein the first plurality of frames of motion picture film are determined response to the second plurality of frames of motion picture film.

5. The method of claim 4
wherein the second plurality of frames of motion picture film are selected from a group consisting of: a print release candidate, a negative, a positive, an internegative, an interpositive, original camera negative, master negative, answer print.

6. The method of claim 4 wherein the first plurality of frames of motion picture film are determined using an image transfer process with respect to the second plurality of frames of motion picture film.

7. The method of claim 1 wherein the plurality of anomalies are selected from a group consisting of: image position, image sizing, desired geometric attributes, color saturation, image brightness, image contrast, density variation, correlation mapping, dust, scratches, water marks, liquid marks, drying marks, exposure errors.

8. The method of claim 1 wherein the second plurality of digital data are selected from a group consisting of: a digital representation of images associated with frames of motion picture film, a digital negative, digital image data.

9. The method of claim 1 wherein the first plurality of digital data comprises a transformation of a first plurality of digital images determined from the first plurality of frames of motion picture film.

10. The method of claim 1 wherein the transformation is selected from a group consisting of: fast Fourier transform, a filter, a rotation, a zoom, an encoding.

11. A method for inspecting a reel of motion picture film comprising a first plurality of frames of motion picture film, wherein the reel of motion picture film has transferred thereon to film stock a sequence of images generated from digital image source data, the method comprising:

receiving a first plurality of digital image data associated with a reel of motion picture film, wherein the first plurality of digital image data comprises data derived from a scan of at least a portion of film stock of the reel of motion picture film having recorded thereon images generated from the digital image source data;

receiving a second plurality of digital image data, wherein the second plurality of digital image data corresponds to at least some images of the sequence of images;

processing the first plurality of digital image data to form a first plurality of digital data;

processing the second plurality of digital image data to form a second plurality of digital data;

comparing digital data from the first plurality of digital data to respective digital data of the second plurality of digital data to determine plurality of anomalies associated with frames of the first plurality of frames of motion picture film; and storing the plurality of anomalies in a log associated with the reel of motion picture film.

12. The method of claim 11 further comprising determining a classification for the reel of motion picture in response to the plurality of anomalies.

13. The method of claim 11 wherein the reel of motion picture film comprises a reel selected from a group consisting of: a print release candidate, a negative, a positive, an internegative, an interpositive, original camera negative, master negative, answer print.

14. The method of claim 11
wherein receiving the second plurality of digital image data comprises scanning a source reel of motion picture film; and
wherein the reel of motion picture film is determined in response to the source reel of motion picture film.

15. The method of claim 14
wherein the source reel of motion picture film is selected from a group consisting of: a print release candidate, a negative, a positive, an internegative, an interpositive, original camera negative, master negative, answer print.

16. The method of claim 14 wherein the plurality of anomalies are selected from a group consisting of: image position, image sizing, desired geometric attributes, color saturation, image brightness, image contrast, density variation, correlation mapping, dust, scratches, water marks, liquid marks, drying marks, exposure errors.

17. The method of claim 11 wherein the second plurality of digital image data is selected from a group consisting of: a digital representation of sources images associated with the reel of motion picture film, a digital negative, a digital positive, digital image data.

18. The method of claim 11
wherein processing the first plurality of digital image data to form the first plurality of digital data comprises performing a transform on the first plurality of digital image data,
wherein the transformation is selected from a group consisting of: fast Fourier transform, a filter, a rotation, a zoom, an encoding.

19. The method of claim 11 wherein the second plurality of digital image data are selected from a group consisting of: video tap feed, procedurally generated images, test patterns, test charts.

* * * * *